No. 611,954.  
S. W. AKINS.  
SELF BASTING ROASTING PAN.  
(Application filed Jan. 22, 1898.)  
Patented Oct. 4, 1898.

(No Model.)

Witnesses  
Edith Himsworth  
Fred E. Wyatt

Inventor  
S. W. Akins  
By his Attorney

UNITED STATES PATENT OFFICE.

SAMUEL W. AKINS, OF DENVER, COLORADO.

SELF-BASTING ROASTING-PAN.

SPECIFICATION forming part of Letters Patent No. 611,954, dated October 4, 1898.

Application filed January 22, 1898. Serial No. 667,523. (No model.)

*To all whom it may concern:*

Be it known that I, SAMUEL W. AKINS, a citizen of the United States of America, residing at Denver, in the county of Arapahoe and State of Colorado, have invented certain new and useful Improvements in Self-Basting Roasting-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in roasting-pans, my object being to provide a pan in which a fowl or other meat may be roasted without opening the receptacle in which it is placed.

The invention consists of an open outer pan and a closed cylindrical receptacle or pan whose extremities are trunnioned in the ends of the outer pan, the cylindrical pan being centrally divided longitudinally and the two parts hinged together, whereby the pan may be opened for the purpose of putting in the meat to be roasted or removing it after the roasting process is completed. The closed pan is also provided with an arm projecting beyond and normally resting upon the edge of the outer pan to facilitate the giving of the closed pan half-revolutions alternately in reverse directions, whereby the basting of the meat is perfected without opening the closed pan.

Having thus briefly outlined the construction of my improved roasting-pan, I will proceed to describe the same in detail and then point out the novel features in the claims, reference being made to the accompanying drawings, in which is illustrated an embodiment thereof.

Figure 1:
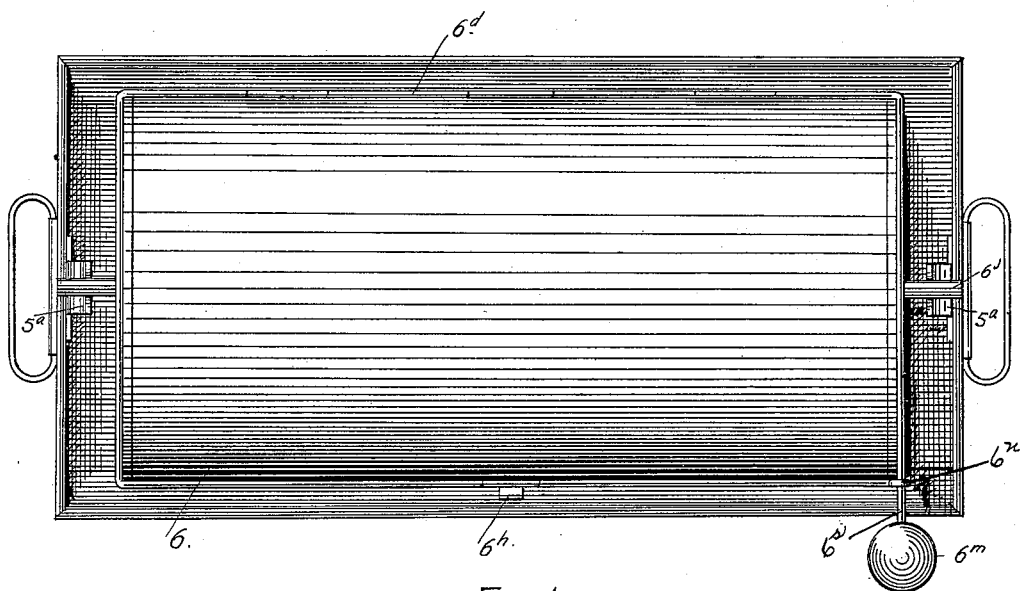
Figure 2:
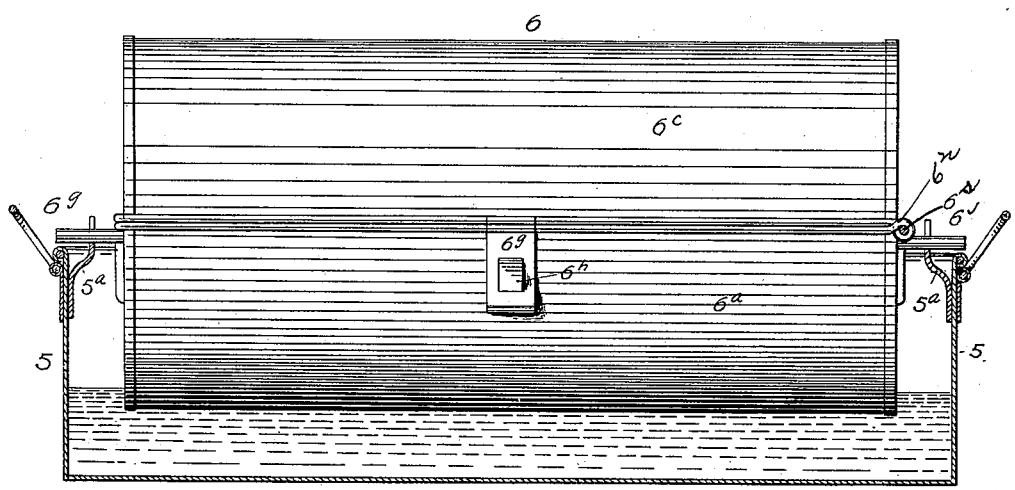

In the drawings, Figure 1 is a top or plan view of my improved roasting-pan. Fig. 2 is a vertical longitudinal section taken through the outer pan, the inner closed pan being shown in elevation.

Similar reference characters indicating corresponding parts in these views, let the numeral 5 designate the outer pan, whose extremities are provided with brackets $5^a$, having forked upper extremities. These brackets form the support for the closed cylindrical pan 6, composed of two semicylindrical parts $6^a$ and $6^c$, hinged together, as shown at $6^d$. The part $6^c$ is provided with a hinged hasp $6^g$, which engages a lug $6^h$, formed on the part $6^a$. The extremities of the part $6^a$ are provided with short journals or trunnions $6^j$, which engage the forked extremities of the brackets $5^a$, which support the pan 6 in such a manner that there is a suitable space left between the two pans, whereby the pan 6 may be moved freely on its trunnions.

When the apparatus is in use, the pan 5 is provided with a quantity of water which engages the pan 6 and prevents its contents from burning. The engaging edges of the semicylindrical parts $6^a$ and $6^c$ of the pan 6 are provided with strengthening-wires, as is common in this class of construction. This wire on one extremity of the part $6^a$ is extended horizontally to form an arm $6^s$, which rests upon the upper edge of the pan 5, its outer extremity being provided with a ball which acts as a weight, causing the pan 6 to complete a half-revolution quickly and automatically after it has passed the dead-center of the half-turn. The intersecting side wire is twisted around the arm-wire $6^s$, as shown at $6^n$.

When my improved roasting-pan is in use, the fowl or other meat is placed in the pan 6, together with suitable seasoning material. This pan is then closed and placed in position in the outer pan 5, which is provided with a suitable quantity of water for the purpose. The combined roasting-pan is then placed in the oven, the cylindrical pan being given a half-revolution from time to time, whereby the juices are distributed and run down over the meat first from one side and then the other, whereby the seasoning is cooked thereinto without opening the cylindrical pan for basting in the ordinary manner. Hence the pan 6 need not be opened until the meat is cooked. The water in the pan 5 prevents the meat from burning.

Having thus described my invention, what I claim is—

1. In a self-basting roasting-pan, the combination of the open outer pan and the cylindrical pan trunnioned thereon and consisting of two semicylindrical parts whose adjacent edges are hinged together and adapted to be fastened together on the opposite side thereof, the edges of said parts being provided with strengthening-wires, one of which is extended to project over the edge of the open pan, forming an arm provided with a weight to facilitate turning and limit the movement to a half-rotation in either direction, the intersecting wire of the same part being suitably fastened to the said extended wire, the inner surface of the cylindrical pan being smooth, the outer pan being adapted to hold water.

2. In a self-basting roasting-pan, the combination of an open outer pan and a cylindrical pan trunnioned thereon and consisting of two semicylindrical parts, one part being movable to expose the contents of the pan, an arm attached to the other part of the cylindrical pan and projecting over the edge of the outer pan upon which the arm is adapted to rest, and a weight attached to the outer extremity of said arm and projecting beyond the outer pan whereby it is accessible for the purpose of manipulating the cylindrical pan, the said weight holding the cylindrical pan in such a position that the plane separating the two semicylindrical parts shall occupy a horizontal position when the movable pan is at rest.

In testimony whereof I affix my signature in presence of two witnesses.

SAMUEL W. AKINS.

Witnesses:
G. J. ROLLANDET,
EDITH HIMSWORTH.